United States Patent
Schön et al.

(10) Patent No.: US 12,420,927 B2
(45) Date of Patent: Sep. 23, 2025

(54) INTERIOR AIRCRAFT LIGHTING ASSEMBLY, AIRCRAFT PASSENGER SERVICE UNIT WITH AN INTERIOR AIRCRAFT LIGHTING ASSEMBLY, AND METHOD OF OPERATING AN INTERIOR AIRCRAFT LIGHTING ASSEMBLY

(71) Applicant: Goodrich Lighting Systems GmbH & Co. KG, Lippstadt (DE)

(72) Inventors: Christian Schön, Dortmund (DE); Andre Hessling-von Heimendahl, Koblenz (DE)

(73) Assignee: Goodrich Lighting Systems GmbH & Co. KG, Lippstadt (DE)

( * ) Notice: Subject to any disclaimer, the term of this patent is extended or adjusted under 35 U.S.C. 154(b) by 0 days.

(21) Appl. No.: 18/980,381

(22) Filed: Dec. 13, 2024

(65) Prior Publication Data
US 2025/0108920 A1    Apr. 3, 2025

Related U.S. Application Data

(63) Continuation of application No. 18/607,799, filed on Mar. 18, 2024, now Pat. No. 12,168,514.

(30) Foreign Application Priority Data

Mar. 30, 2023    (EP) ..................................... 23165739

(51) Int. Cl.
*B64D 11/00*    (2006.01)
*F21V 23/00*    (2015.01)
(Continued)

(52) U.S. Cl.
CPC ............ *B64D 11/00* (2013.01); *F21V 23/003* (2013.01); *F21V 23/02* (2013.01);
(Continued)

(58) Field of Classification Search
CPC ........ B64D 2011/0053; F21W 2107/30; F21Y 2113/30; F21V 23/003; H05B 47/13
See application file for complete search history.

(56) References Cited

U.S. PATENT DOCUMENTS 10,616,463 B2   4/2020   Johannessen et al.
11,292,610 B2   4/2022   Brüchmann
(Continued)

OTHER PUBLICATIONS

European Patent Office; European Search Report filed Sep. 1, 2023 in Application No. 23165739.6.
(Continued)

*Primary Examiner* — Sean P Gramling
(74) *Attorney, Agent, or Firm* — SNELL & WILMER L.L.P.

(57) ABSTRACT

An interior aircraft lighting assembly comprises: at least one infrared lighting device for emitting infrared light; at least one further lighting device for emitting visible light; a lighting assembly controller for controlling an operation of the at least one infrared lighting device and of the at least one further lighting device; a supplementary infrared lighting device controller; and a power supply network, which is configured for supplying electric power from the lighting assembly controller to the at least one further lighting device. The supplementary infrared lighting device controller is tapped into the power supply network. The lighting assembly controller is configured to provide an electric trigger pulse on the power supply network for activating the at least one infrared lighting device.

18 Claims, 6 Drawing Sheets

(51) Int. Cl.
  *F21V 23/02*   (2006.01)
  *F21W 106/00*  (2018.01)
  *F21W 107/30*  (2018.01)
  *F21Y 113/00*  (2016.01)

(52) U.S. Cl.
  CPC .. *B64D 2011/0053* (2013.01); *F21W 2106/00* (2018.01); *F21W 2107/30* (2018.01); *F21Y 2113/30* (2023.05)

(56) References Cited

U.S. PATENT DOCUMENTS

| | | |
|---|---|---|
| 11,297,700 B2 | 4/2022 | Lee |
| 2017/0231055 A1 | 8/2017 | Yadav et al. |
| 2018/0141663 A1 | 5/2018 | Hessling-Von Heimendahl et al. |
| 2019/0249847 A1 | 8/2019 | Hallack et al. |
| 2021/0307445 A1 | 10/2021 | Leegate et al. |
| 2022/0097853 A1 | 3/2022 | Jha et al. |

OTHER PUBLICATIONS

USPTO; Notice of Allowance dated Aug. 13, 2024 in U.S. Appl. No. 18/607,799.

U.S. Appl. No. 18/607,799, Interior Aircraft Lighting Assembly, Aircraft Passenger Service Unit With An Interior Aircraft Lighting Assembly, And Method Of Operating An Interior Aircraft Lighting Assembly, filed Mar. 18, 2024, Christian Schön.

INTERIOR AIRCRAFT LIGHTING ASSEMBLY, AIRCRAFT PASSENGER SERVICE UNIT WITH AN INTERIOR AIRCRAFT LIGHTING ASSEMBLY, AND METHOD OF OPERATING AN INTERIOR AIRCRAFT LIGHTING ASSEMBLY

CROSS-REFERENCE TO RELATED APPLICATIONS

This application is a Continuation of, claims priority to and the benefit of, U.S. Non-Provisional application Ser. No. 18/607,799, filed Mar. 18, 2024 and titled "INTERIOR AIRCRAFT LIGHTING ASSEMBLY, AIRCRAFT PASSENGER SERVICE UNIT WITH AN INTERIOR AIRCRAFT LIGHTING ASSEMBLY, AND METHOD OF OPERATING AN INTERIOR AIRCRAFT LIGHTING ASSEMBLY," which claims priority to, EP Patent Application No. 23165739.6, filed Mar. 30, 2023 and titled "INTERIOR AIRCRAFT LIGHTING ASSEMBLY, AIRCRAFT PASSENGER SERVICE UNIT WITH AN INTERIOR AIRCRAFT LIGHTING ASSEMBLY AND METHOD OF OPERATING AN INTERIOR AIRCRAFT LIGHTING ASSEMBLY," which are incorporated by reference herein in their entirety for all purposes.

FIELD

The present invention is in the field of interior aircraft lighting, in particular in the field of interior infrared lighting, which is employed for surveillance in a passenger cabin of an aircraft.

BACKGROUND

In order to enhance security, passenger aircraft, such as commercial airplanes, are often equipped with camera-based video surveillance systems for monitoring processes on board the aircraft. In order to allow such surveillance systems to operate in a dark environment, for example when the cabin lights of the aircraft are dimmed or switched off, the surveillance systems may include cameras that are sensitive to infrared light (IR light) and infrared lighting devices for emitting infrared light.

It would be beneficial to provide an interior aircraft lighting assembly, including at least one switchable infrared lighting device, wherein the interior aircraft lighting assembly allows for conveniently controlling the operation of the at least one infrared lighting device.

SUMMARY

Exemplary embodiments of the invention include an interior aircraft lighting assembly, the interior aircraft lighting assembly comprising at least one infrared lighting device for emitting infrared light; at least one further lighting device for emitting visible light; a lighting assembly controller for controlling an operation of the at least one infrared lighting device and of the at least one further lighting device; a supplementary infrared lighting device controller; and a power supply network, which is configured for supplying electric power from the lighting assembly controller to the at least one further lighting device. The supplementary infrared lighting device controller is tapped into the power supply network, and the lighting assembly controller is configured to provide an electric trigger pulse on the power supply network for activating the at least one infrared lighting device. The supplementary infrared lighting device controller is electrically coupled to the at least one infrared lighting device, and it is configured to enable a flow of electric power to the at least one infrared lighting device in response to detecting the electric trigger pulse, which is provided by the lighting assembly controller on the power supply network. The supplementary infrared lighting device controller is configured such that it causes the at least one infrared lighting device to emit infrared light for an infrared lighting duration, which is longer than a duration of the electric trigger pulse.

Exemplary embodiments of the invention also include an aircraft passenger service unit comprising at least one interior aircraft lighting assembly according to an exemplary embodiment of the invention. The aircraft passenger service unit may in particular further comprise at least one of a loudspeaker, a gasper and a passenger oxygen supply mask. The aircraft passenger service unit may also comprise a plurality of gaspers and/or a plurality of passenger oxygen supply masks. The aircraft passenger service unit may in particular be an overhead aircraft passenger service unit and may be installed in an upper portion/overhead portion of an aircraft interior/aircraft cabin.

Exemplary embodiments of the invention further include an aircraft, such as an airplane or a helicopter, wherein the aircraft comprises an interior aircraft lighting assembly according to an exemplary embodiment of the invention and/or wherein the aircraft comprises an aircraft passenger service unit according to an exemplary embodiment of the invention.

Exemplary embodiments of the invention also include an aircraft cabin surveillance system, comprising a plurality of interior aircraft lighting assemblies according to an exemplary embodiment of the invention and one or more infrared cameras, arranged for taking pictures of the aircraft cabin. In particular, the one or more infrared cameras may be operated to take pictures of the aircraft cabin, when one or more portions of the aircraft cabin are illumination with infrared light via the plurality of interior aircraft lighting assemblies.

Exemplary embodiments of the invention also include a method of operating an interior aircraft lighting assembly, which comprises at least one infrared lighting device for emitting infrared light and at least one further lighting device for emitting visible light. The method comprises, with a lighting assembly controller, supplying electric power to the at least one further lighting device via a power supply network, coupled between the lighting assembly controller and the at least one further lighting device, for operating the at least one further lighting device; with the lighting assembly controller, providing an electric trigger pulse on the power supply network for activating the at least one infrared lighting device; with a supplementary infrared lighting device controller, which is tapped into the power supply network, detecting the electric trigger pulse, provided by the lighting assembly controller on the power supply network, and enabling power flow to the at least one infrared lighting device in response to detecting the electric trigger pulse; and with the supplementary infrared lighting device controller, causing the at least one infrared lighting device to emit infrared light for an infrared lighting duration, which is longer than a duration of the electric trigger pulse.

In an interior aircraft lighting assembly according to an exemplary embodiment of the invention, the lighting assembly controller is able to activate the at least one infrared lighting device by supplying an electric trigger pulse via the power supply network. In consequence, the at least one infrared lighting device may be selectively activated by the lighting assembly controller using the existing power supply network, i.e. without adding additional power supply line(s) and/or control line(s).

As a result, an interior aircraft lighting assembly according to an exemplary embodiment of the invention may allow for adding at least one switchable infrared lighting device, without fundamentally re-designing the interior aircraft lighting assembly. In consequence, an interior aircraft lighting assembly according to an exemplary embodiment of the invention may be manufactured at low costs by adding at least one infrared lighting device and a supplementary infrared lighting device controller to an existing design of an interior aircraft lighting assembly.

In an embodiment, the interior aircraft lighting assembly is multi-functional interior aircraft lighting assembly, which allows for selectively providing visible light, for example in the form of a reading light output, and infrared surveillance light for enabling surveillance in a dark/dim environment. Such a multi-functional interior aircraft lighting assembly may provide for a compact and cost efficient way of adding infrared illumination to the interior of an aircraft.

In an embodiment, the duration of the electric trigger pulse is between 10 ms and 100 ms, the duration of the electric trigger pulse may in particular be between 25 ms and 75 ms, more particularly between 40 ms and 60 ms. Electric trigger pulses in the range of between 10 ms and 100 ms, in particular between 25 ms and 75 ms, and more particularly between 40 ms and 60 ms, have been found as well-suited for reliably activating the at least one infrared lighting device, without causing significant flickering of the visible light output.

In an embodiment, the supplementary infrared lighting device controller is configured such that the at least one infrared lighting device remains activated for a predetermined infrared lighting duration. The predetermined infrared lighting duration may in particular extend beyond the end of the detected electric trigger pulse, provided on the power supply network for activating the at least one infrared lighting device. In other words, the electric trigger pulse may be used only for activating the at least one infrared lighting device, but the length of the electric trigger pulse does not specify or modify the infrared lighting duration, for which the at least one infrared lighting device remains activated. The infrared lighting duration is independent from the duration of the electric trigger pulse.

In an embodiment, the supplementary infrared lighting device controller continuously supplies electric power to the at least one infrared lighting device, after the at least one infrared lighting device has been activated. In particular, the supplementary infrared lighting device controller may continuously supply electric power to the at least one infrared lighting device for the predetermined infrared lighting duration.

In an alternative embodiment, after the at least one infrared lighting device has been activated, the supplementary infrared lighting device controller supplies electric power pulses to the at least one infrared lighting device for a predefined infrared lighting duration that is longer than the length of the electric trigger pulse that is used for activating the at least one infrared lighting device. Each of the electric power pulses, supplied to the at least one infrared lighting device, may be shorter or longer than the electric trigger pulse that is used for activating the at least one infrared lighting device. In other words, the supplementary infrared lighting device controller may act as a pulsed power supply to the at least one infrared lighting device. Other suitable forms of power supplies are possible as well. The concrete implementation of the power output of the supplementary infrared lighting device controller to the at least one infrared lighting device may depend on and be adapted to the concrete implementation of the at least one infrared lighting device.

In an embodiment, the predefined infrared lighting duration may be at least ten times longer than the duration of the electric trigger pulse. The predefined infrared lighting duration may in particular be at least a hundred times longer or a thousand times longer than the electric trigger pulse.

In an embodiment, the supplementary infrared lighting device controller is configured to disable power flow to the at least one infrared lighting device after the predetermined infrared lighting duration.

In an embodiment, the predetermined infrared lighting duration is between 1 minute and 8 hours. In particular, the predetermined infrared lighting duration may be adapted to one or more specific surveillance use case(s). For example, the predetermined infrared lighting duration may be in the order of minutes, in order to allow for an ad-hoc check of selected parts of the aircraft cabin. It is also possible that the predetermined infrared lighting duration is in the order of hours, in order to allow for a continuous check of selected parts of the aircraft cabin, such as over an extended period of time during a night flight.

In an embodiment, the supplementary infrared lighting device controller is configured for supplying electric power to the at least one infrared lighting device until a second electric trigger pulse is detected by the supplementary infrared lighting device controller. In such an embodiment, the lighting assembly controller may be configured for supplying a second electric trigger pulse on the power supply network for deactivating the at least one infrared lighting device.

In an embodiment, the lighting assembly controller is configured to provide the electric trigger pulse by temporarily raising or lowering an electric voltage applied to at least one power supply line of the power supply network with respect to a ground line. The electric trigger pulse may in particular include temporarily raising or lowering the electric voltage, applied to at least one power supply line, by between 1 V and 30 V.

The supplementary infrared lighting device controller may be configured for detecting a temporary raise or a temporary lowering of the electric voltage, applied to at least one power supply line, as an indicator for activating the at least one infrared lighting device. Temporarily raising or lowering an electric voltage applied to at least one power supply line may allow for reliably activating the at least one infrared lighting device, while keeping undesired side effects, such as flicker of the light output of the at least one further lighting device, low.

In an embodiment, the lighting assembly controller is configured to provide the electric trigger pulse by temporarily changing a polarity of the electric voltage applied to at least one power supply line of the power supply network with respect to a ground line. The supplementary infrared lighting device controller may be configured for detecting a temporary change of the polarity of the electric voltage, applied to at least one power supply line, as an indicator for activating the at least one infrared lighting device. Temporarily changing a polarity of the electric voltage, applied to at least one power supply line of the power supply network, may allow for activating the at least one infrared lighting device in a particularly reliable manner.

In an embodiment, the interior aircraft lighting assembly comprises an electric damping circuit, which is electrically coupled to the power supply network for absorbing the electric trigger pulse. The electric damping circuit may prevent the electric trigger pulse from being forwarded to/absorbed by the at least one further lighting device. Providing such an electric damping circuit may allow for preventing the at least one further lighting device from flickering due to electric trigger pulses, provided on the power supply network.

In an embodiment, the electric damping circuit is integrated with the supplementary infrared lighting device controller. Such a configuration may allow for conveniently adding the electric damping circuit, together with the supplementary infrared lighting device controller, to an existing design of an interior aircraft lighting assembly.

In an alternative embodiment, the electric damping circuit may be provided separately from the supplementary infrared lighting device controller; the electric damping circuit may in particular be integrated with the at least one further lighting device. This configuration may provide for the at least one further lighting device to be inherently resistant to flickering.

In an embodiment, the electric damping circuit comprises at least one capacitor or a combination of at least one capacitor and at least one resistor.

The electric components of the electric damping circuit may be dimensioned for absorbing the electric trigger pulse, before the at least one further lighting device reacts to the electric energy of the electric trigger pulse, in particular before the at least one further lighting device starts to flicker.

In an embodiment, the at least one further lighting device comprises one or more visual sign lighting devices. The one or more visual sign lighting devices may in particular include at least one non-smoking signal light, which is configured for providing at least one illuminated non-smoking sign, and/or at least one fasten-your-seatbelt signal light, which is configured for providing at least one illuminated fasten-your-seatbelt sign. The one or more visual sign lighting devices may provide the signal light output in any suitable color, such as red. For this purpose, the one or more visual sign lighting devices may have colored light source(s), such as red LED(s), and/or may have suitable color filter(s). The color filter may transform the white light output of one or more white light sources, such as one or more white LEDs, into a signal light output of a suitable color. The shape of the signal light output may be provided via a suitable screen/via a shutter of suitable shape.

In an embodiment, the at least one further lighting device comprises one or more passenger reading lights. The passenger reading lights may be individually switchable and/or the direction of light emission, generated by the passenger reading lights, may be adjustable. The one or more passenger reading lights may provide white reading light output(s). The white reading light output(s) may be targeted to a passenger seat tray region, located forward of the passenger body in the longitudinal direction of the aircraft cabin.

In an embodiment, the at least one further lighting device includes at least one passenger reading light, and the power supply network is configured for supplying electric power from the lighting assembly controller to the at least one passenger reading light.

In such an embodiment, the power supply network may comprise a permanent power supply line and a permanent ground line. The power supply network may further comprise one or more switchable ground lines, wherein a respective switchable ground line is associated with each of the passenger reading lights. Each of the switchable ground lines may be switchable by the lighting assembly controller for selectively activating and deactivating the respectively associated passenger reading light.

The supplementary infrared lighting device controller may be electrically coupled between the permanent power supply line and the permanent ground line, and the lighting assembly controller may be configured to provide the electric trigger pulse on the permanent power supply line.

In such an embodiment, as the supplementary infrared lighting device controller is electrically coupled between the permanent power supply line and the permanent ground line, the infrared lighting device controller is operable independently of the passenger reading lights. The at least one infrared lighting device may in particular by activated, even if all passenger reading lights are switched off. In other words, the supplementary infrared lighting device controller constantly has electric power available and can pass on said electric power to the at least one infrared lighting device in a straightforward manner. In case multiple infrared lighting devices are coupled to the supplementary infrared lighting device controller, the supplementary infrared lighting device controller may be configured to operate all infrared lighting devices in response to detecting the electric trigger pulse on the permanent power supply line or may be configured to operate selected one(s) of the infrared lighting devices in response to detecting the electric trigger pulse on the permanent power supply line.

In an embodiment, the at least one further lighting device includes at least one visual sign lighting device and the power supply network is configured for supplying electric power from the lighting assembly controller to the at least one visual sign lighting device. The power supply network may comprise at least one switchable power supply line and a permanent ground line. The power supply network may in particular comprise a respective switchable power supply line for each of the at least one visual sign lighting device.

Each visual sign lighting device may be electrically coupled between one of the switchable power supply lines and the permanent ground line, and the at least one switchable power supply line may be switchable by the lighting assembly controller for selectively activating and deactivating the at least one visual sign lighting device.

In such an embodiment, the supplementary infrared lighting device controller may be electrically coupled between one or more of the at least one switchable power supply line and the permanent ground line, and the lighting assembly controller may in particular be configured for providing the electric trigger pulse on one or more of the at least one switchable power supply line. In case the supplementary infrared lighting device is coupled to exactly one of the at least one switchable power supply line, the lighting assembly controller may be configured for providing the electric trigger pulse on the particular switchable power supply line that is coupled to the supplementary infrared lighting device controller. In case there are multiple visual sign lighting devices and multiple switchable power supply lines and in case the supplementary infrared lighting device is coupled to said multiple switchable power supply lines, the lighting assembly controller may be configured for providing the electric trigger pulse on any one of said multiple switchable power supply lines. In particular, the lighting assembly controller may be configured to use a particular one of said multiple switchable power supply lines for the electric trigger pulse or may be configured to be able to use a subset of all of said multiple switchable power supply lines for the electric trigger pulse and may select one or more of said multiple switchable power supply lines for a particular instance of the electric trigger pulse, depending on additional information, such as depending on which of the multiple visual sign lighting devices is currently in an on-state.

In an embodiment, the supplementary infrared lighting device controller is electrically coupled between the permanent ground line and a switchable power supply line that is associated with a visual sign lighting device that is normally on, i.e. on during most operating states of the aircraft. Such a normally on visual sign lighting device could be a non-smoking signal light. In case of using the power supply line of such a normally on visual sign lighting device, the supplementary infrared lighting device controller has electric power readily available during most operating states of the aircraft and can pass on said electric power to the at least one infrared lighting device in a straightforward manner.

In an embodiment where the supplementary infrared lighting device controller is coupled between a permanent ground line and a switchable power supply line, two electric lines of an existing design, namely the switchable power supply line of a visual sign lighting device and the permanent ground line, may suffice to be tapped for coupling the supplementary infrared lighting device controller to the power supply network. This may make the installation of the supplementary infrared lighting device controller and the at least one infrared lighting device within the interior aircraft lighting assembly even easier, as compared to an embodiment in which three electric lines, for example a permanent power supply line, a permanent ground line, and a switchable ground line, are tapped for coupling the supplementary infrared lighting device controller to the power supply network.

Keeping the number of electric lines to be tapped low may in particular be beneficial in case of retrofitting applications, i.e. in situations in which a supplementary infrared lighting device controller and at least one infrared lighting device according to exemplary embodiments of the invention are added to an existing interior aircraft lighting assembly.

It is pointed out that the coupling of the supplementary infrared lighting device controller to the power supply network, as described in the preceding paragraphs, is considered its own invention. In particular, the coupling of the supplementary infrared lighting device controller between different combinations of permanent power supply line(s), switchable power supply line(s), permanent ground line(s), and switchable ground line(s), as described above, is considered inventive per se. By being their own inventions, above described embodiments of the coupling of the supplementary infrared lighting device controller to the power supply network are considered inventive, without the features regarding the activation control of the supplementary infrared lighting device controller via the electric trigger pulse. In terms of the appended claims, the feature combinations of claims 1, 9, and 10 and of claims 1 and 12 are considered inventive, even without the features of claim 1 that relate to the activation control via the electric trigger pulse. A particularly good integration into a system with at least one passenger reading light and/or at least one visual sign lighting device may also be achieved with a different type of activation control.

In an embodiment, the at least one infrared lighting device is spaced from the at least one further lighting device. In particular, the at least one infrared lighting device may have its own light transmissive cover, i.e. the at least one infrared lighting device may provide the infrared light output from a different location and through a different light transmissive cover, as compared to the at least one further lighting device. However, it is also possible that the at least infrared lighting device, or at least parts thereof, is/are integrated with the at least one further lighting device. For example, the light source(s) of an infrared lighting device, as employed in an interior aircraft lighting assembly according to an exemplary embodiment of the invention, may be arranged on the same circuit board as the light source(s) of a passenger reading light, as employed in an interior aircraft lighting assembly according to an exemplary embodiment of the invention. It is then possible that the light source(s) of the infrared lighting device and the light source(s) of the passenger reading light share a common housing and/or a common optical system, such as a common lens for directing the infrared light and the visible light. The infrared light output and the visible light output may have different light output directions, e.g. due to a spaced arrangement of the light source(s) of the infrared lighting device and the light source(s) of the passenger reading light.

BRIEF DESCRIPTION OF THE DRAWINGS

Further exemplary embodiments of the invention will be described with respect to the accompanying drawings, wherein.

DETAILED DESCRIPTION

Figure 1:
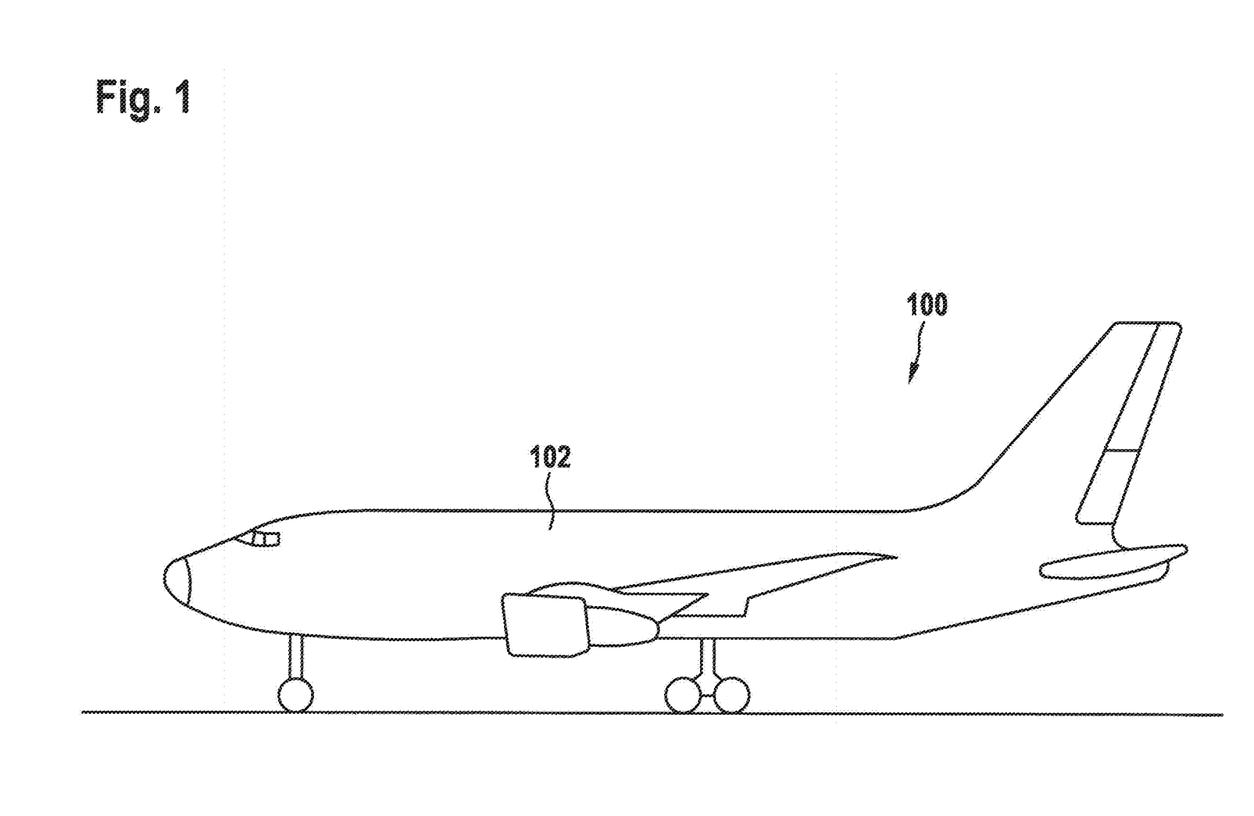
FIG. 1 shows a schematic side view of an aircraft in accordance with an exemplary embodiment of the invention.

FIG. 1 is a schematic side view of an aircraft 100 in accordance with an exemplary embodiment of the invention. The aircraft 100 is a large commercial passenger airplane and has a passenger cabin 102.

Figure 2A:
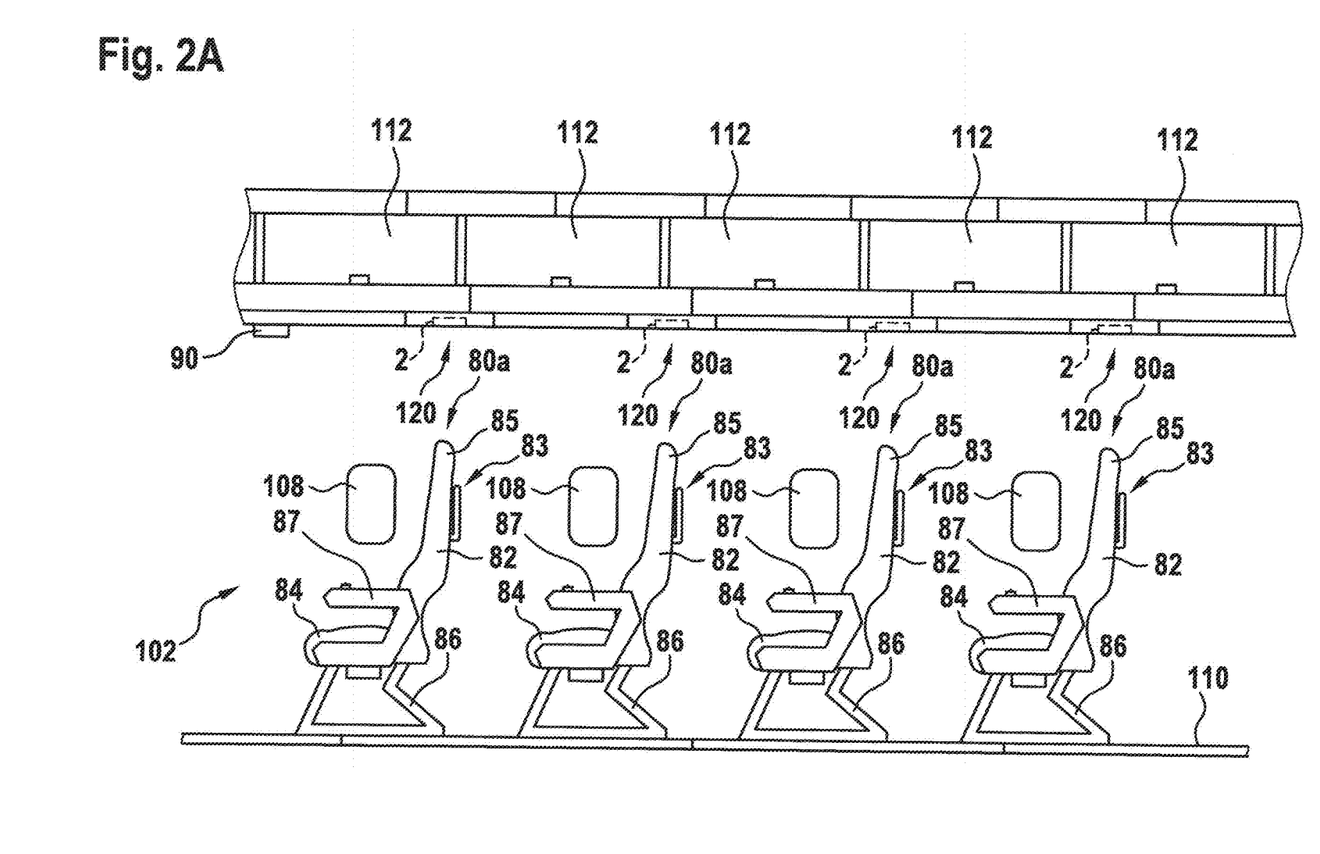
FIG. 2A shows a longitudinal cross-sectional view of a portion of the passenger cabin of the aircraft shown in FIG. 1.
Figure 2B:
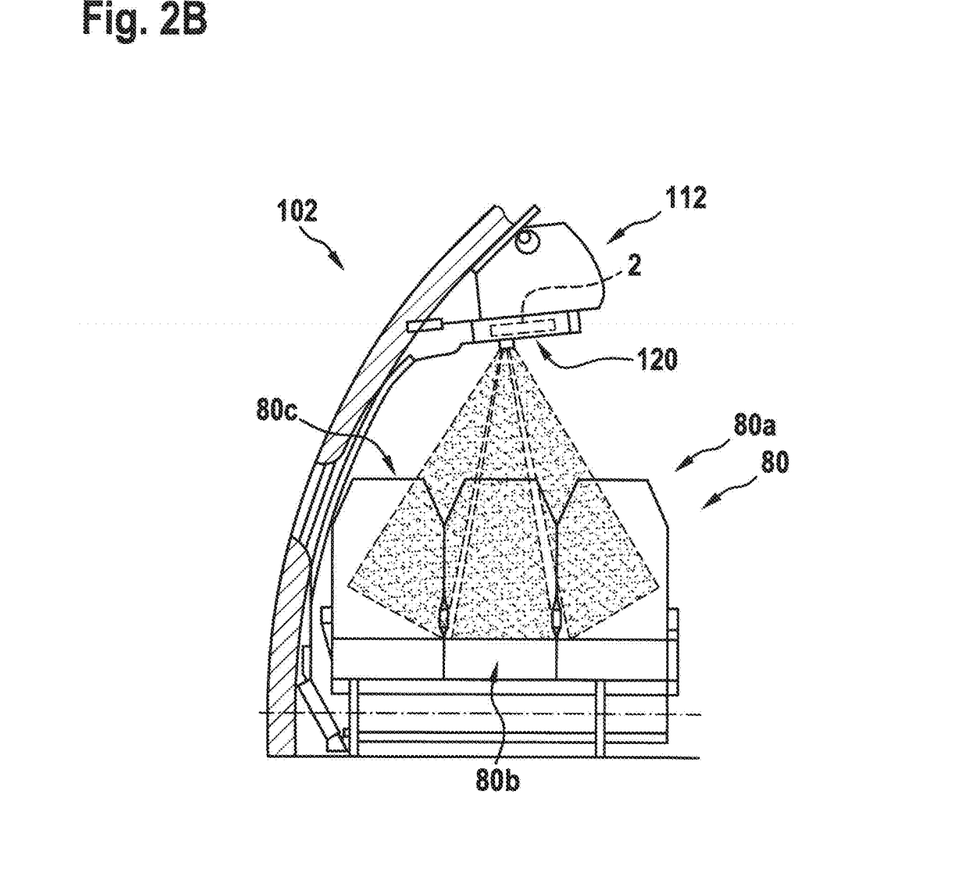
FIG. 2B shows a lateral cross-sectional view of a portion of the passenger cabin of the aircraft shown in FIG. 1.

FIG. 2A shows a longitudinal cross-sectional view of a portion of the passenger cabin 102 of the aircraft 100 of FIG. 1. FIG. 2B shows a partial lateral cross-sectional view of the passenger cabin 102 of the aircraft 100 of FIG. 1, i.e. a cross-sectional view in a plane which is oriented orthogonal to the longitudinal direction of the aircraft 100.

Four seats 80a, also referred to as passenger seats 80a, are depicted in FIG. 2A. The passenger seats 80a are mounted to a floor 110 of the passenger cabin 102. Each of the depicted passenger seats 80a belongs to a different seating row 80.

For each of the seating rows 80, a window 108 is provided, which allows the passengers to view the outside of the aircraft 100. Further, a plurality of overhead baggage compartments 112 are shown, which provide storage space for baggage.

Each seating row 80 includes three passenger seats 80a, 80b, 80c arranged next to each other, as shown in FIG. 2B. The second and third passenger seats (middle seats and window seats) 80b, 80c of each seating row 80 are not visible in FIG. 2A, as they are arranged behind and therefore hidden by the depicted first passenger seats (aisle seats) 80*a*.

Each of the passenger seats 80*a* has a seat pan 84, a seat base 86, an arm rest 87, and a seat back (backrest) 82, including a head rest 85, and a foldable table 83, mounted to a rear side of the backrest 82. The foldable table 83 may also be referred to as passenger seat tray 83. The arm rest 87 may be pivotable around a horizontal axis. The seat base 86 supports the backrest 82 and the seat pan 84.

An overhead passenger service unit (PSU) 120 according to an exemplary embodiment of the invention is arranged above each of the seat rows 80, respectively. Each PSU 120 may comprise gaspers, loudspeaker(s), emergency oxygen supply masks and one or more service call buttons, which are not shown in FIGS. 2A and 2B.

Each PSU 120 further comprises at least one interior aircraft lighting assembly 2 according to an exemplary embodiment of the invention. In the schematic illustrations of FIGS. 2A and 2B, the interior aircraft lighting assemblies 2 are schematically indicated as dashed boxes. The dashed boxes indicate that the interior aircraft lighting assemblies 2 are distributed systems, having their components distributed across the respective PSUs 120. The details of exemplary interior aircraft lighting assemblies 2 will be described below with respect to FIGS. 3, 4, and 5.

In the depicted exemplary embodiment of FIGS. 2A and 2B, each interior aircraft lighting assembly 2 comprises three passenger reading lights for providing individual reading lighting for each passenger sitting in one of the passenger seats 80*a*-80*c*, respectively. This allows the passengers to read, even if the general cabin light is dimmed or switched-off. The three passenger reading light outputs are indicated via hatched light cones in FIG. 2B.

In order to allow for monitoring the passengers, at least one surveillance camera 90 is installed within the passenger cabin 102. The at least one surveillance camera 90 is in particular sensitive to infrared light, in order to allow for monitoring the passengers even in a dark/dim passenger cabin 102. The at least one surveillance camera 90 may additionally be sensitive to visible light, or the at least one surveillance camera 90 may be sensitive to infrared light only.

A surveillance camera 90 may be arranged over each passenger seat or over each row 80 of passenger seats 80*a*-80*c*, respectively. Alternatively or additionally, larger areas of the passenger cabin 102, including a plurality of seat rows 80, may be covered by a single surveillance camera 90.

The at least one surveillance camera 90 may be stationary, with a fixed directivity. Alternatively, the at least one surveillance camera 90 or parts thereof may be movable, in particular pivotable, in order to allow for scanning a larger area of the passenger cabin 102 with a reduced number of surveillance cameras 90. In particular, it may be possible to scan the whole passenger cabin 102 with only a single surveillance camera 90 or to scan well-defined sections of the passenger cabin 102, such as sections between lavatory/galley blocks, with a single surveillance camera 90, respectively.

In order to allow the surveillance camera 90 to take pictures of the passengers even in a dark/dim environment, in particular when the general cabin light and the passenger reading lights are switched off, each of the interior aircraft lighting assemblies 2 comprises at least one infrared lighting device, which is configured for emitting infrared light. With this infrared light output, it is possible to "illuminate" the passengers within the passenger cabin 102 with infrared light, which may be detected by the surveillance camera 90.

Figure 3:
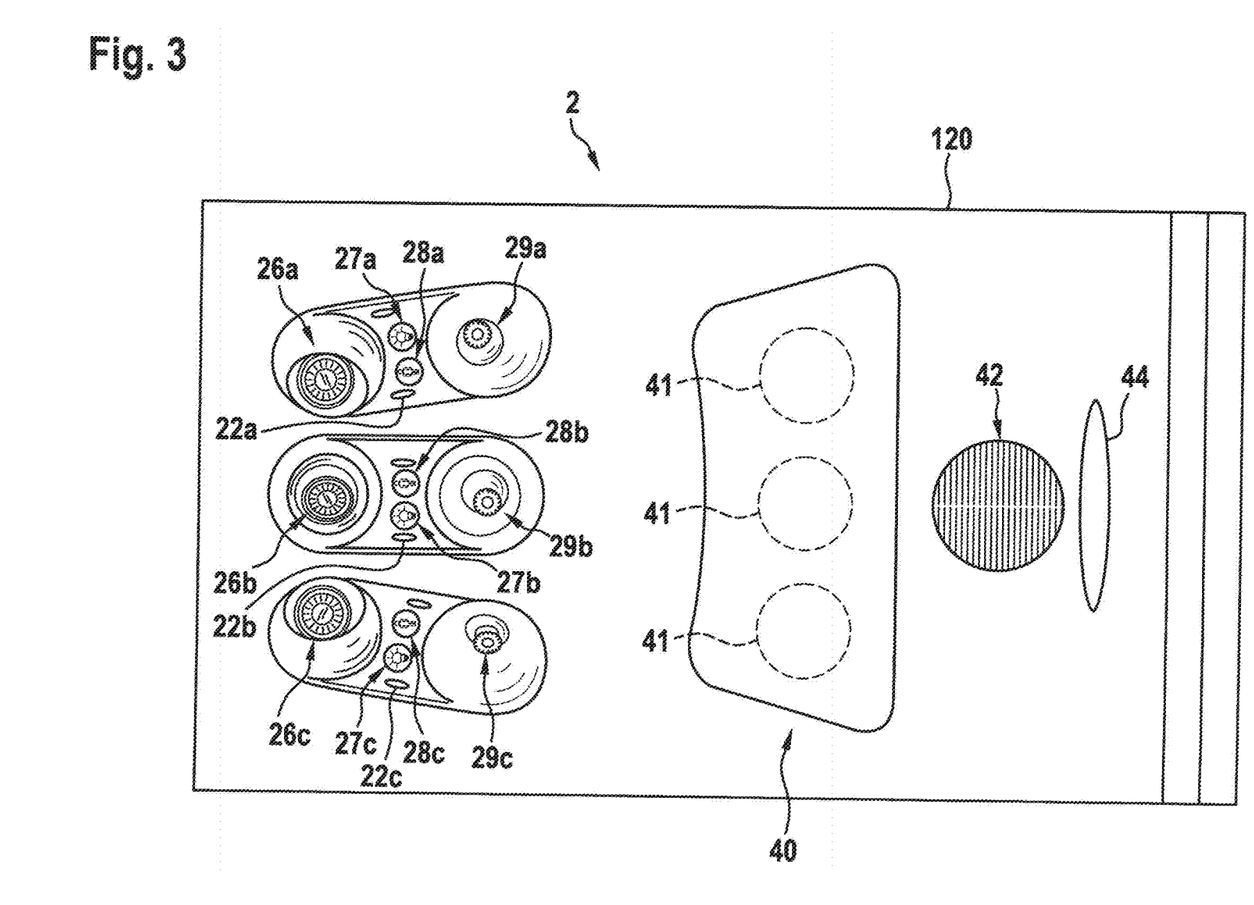
FIG. 3 depicts a schematic view of an overhead aircraft passenger service unit in accordance with an exemplary embodiment of the invention.

FIG. 3 depicts a schematic view of an overhead aircraft passenger service unit (PSU) 120 in accordance with an exemplary embodiment of the invention. The exemplary PSU 120 of FIG. 3 is arranged above the passengers of a single seating row 80, comprising the passenger seats 80*a*, 80*b*, 80*c*, and is depicted from below in FIG. 3, i.e. it is depicted as it is seen from the side of a passenger sitting on one of the passenger seats 80*a*, 80*b*, 80*c* below the aircraft passenger service unit 120. The aircraft passenger service unit 120 of FIG. 3 may be employed in the aircraft cabin 102 of FIGS. 2A and 2B.

On the side shown to the left in FIG. 3, the PSU 120 comprises a row of three adjustable passenger reading lights 26*a*, 26*b*, 26*c*, which are arranged next to each other.

The PSU 120 is further equipped with three infrared lighting devices 22*a*, 22*b*, 22*c*, which are configured for emitting infrared light.

Six electrical switches 27*a*, 27*b*, 27*c*, 28*a*, 28*b*, 28*c* are provided to the right side of the passenger reading lights 26*a*, 26*b*, 26*c*, a pair of two switches 27*a*, 27*b*, 27*c*, 28*a*, 28*b*, 28*c* next to each of the passenger reading lights 26*a*, 26*b*, 26*c*, respectively. One of the switches 27*a*, 27*b*, 27*c* of each pair is configured for switching the adjacent passenger reading light 26*a*, 26*b*, 26*c*, and the second switch 28*a*, 28*b*, 28*c* of each pair is configured for triggering a signal for calling cabin service personnel.

A row of three gaspers 29*a*, 29*b*, 29*c*, arranged besides each other in the lateral direction, is provided next to the switches 27*a*, 27*b*, 27*c*, 28*a*, 28*b*, 28*c*.

Next to the gaspers 29*a*, 29*b*, 29*c*, there is provided a removable cover 40, which covers a cavity housing at least three oxygen supply masks 41. In the event of pressure loss within the passenger cabin 102, the removable cover 40 will open, the oxygen supply masks 41 will drop out of the cavity, and each of the passengers, sitting below the aircraft passenger service unit 120, may grasp one of the oxygen supply masks 41. The oxygen supply masks 41 will be supplied with oxygen from an emergency oxygen supply (not shown), allowing the passengers to continue to breathe normally. The emergency oxygen supply, which is also usually not visible from the passenger seats 80*a*, 80*b*, 80*c* during normal operation, may be installed within or separately from the PSU 120.

On the side opposite to the gaspers 29*a*, 29*b*, 29*c*, a grid 42 is formed within the PSU 120. A loudspeaker, which may be used for delivering acoustic announcements to the passengers, is arranged behind said grid 42.

Next to the grid 42, there is a display panel 44, which may be configured for selectively displaying a plurality of visual signs (not shown), such as a "non-smoking" sign or a "fasten-your-seatbelt" sign. The display panel 44 may be illuminated from behind, in order to deliver visual information to the passengers sitting below the aircraft passenger service unit 120 and/or in other portions of the aircraft cabin 102. The display panel 44 may house one or more visual sign lighting devices, as will be discussed in more detail below. The display panel 44 may also be seen as a particular implementation of one or more such visual sign lighting devices. Different embodiments of the PSU 120, which are not explicitly shown in the figures, may be configured to be installed over rows 80 of passenger seats 80*a*, 80*b*, 80*c* that comprise more or less than three passenger seats 80*a*, 80*b*, 80*c*. The PSU 120 may in particular be adapted in terms of the number of passenger reading lights 26*a*, 26*b*, 26*c*, electrical switches 27*a*, 27*b*, 27*c*, 28*a*, 28*b*, 28*c*, and gaspers 29*a*, 29*b*, 29*c*, corresponding to the number of passenger seats 80*a*, 80*b*, 80*c* arranged below the PSU 120.

The passenger reading lights 26a, 26b, 26c, the infrared lighting devices 22a, 22b, 22c, and the one or more visual sign lighting devices, as provided with the display panel 4, form an interior aircraft lighting assembly 2 in accordance with an exemplary embodiment of the invention. Circuit diagrams of exemplary implementations of the interior aircraft lighting assembly 2 are described below with respect to FIGS. 4 and 5.

Figure 4:
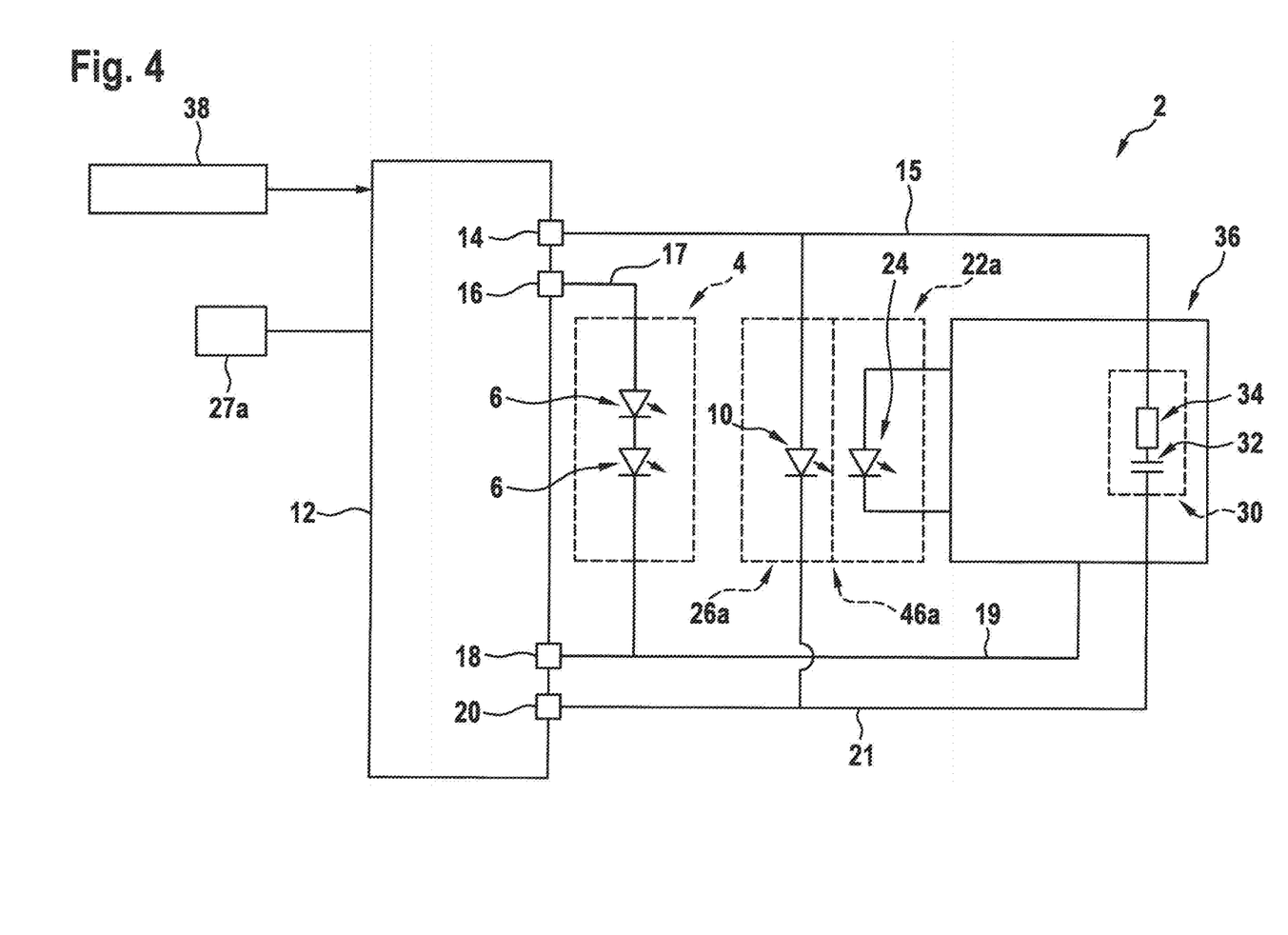
FIG. 4 depicts a circuit diagram of an interior aircraft lighting assembly in accordance with an exemplary embodiment of the invention.

FIG. 4 depicts a circuit diagram of an interior aircraft lighting assembly 2 in accordance with an exemplary embodiment of the invention.

The interior aircraft lighting assembly 2 comprises a first lighting device 4, which is configured for providing an illuminated visual sign, such as a non-smoking sign and/or a fasten-your-seatbelt sign, provided in the PSU 120. The first lighting device 4 may for example be provided at the display panel 44 of the PSU 120 of FIG. 3. In the following, the first lighting device 4 is also denoted as visual sign lighting device 4.

The visual sign lighting device 4 comprises at least one light source 6, for example at least one LED. In the exemplary embodiment depicted in FIG. 4, the first lighting device 4 comprises two light sources 6, which are electrically coupled in a series connection.

The interior aircraft lighting assembly 2 further comprises a second lighting device 26a, which is configured for emitting visible light for providing individual reading lighting for a passenger sitting in one of the passenger seats 80a-80c. In the following, the second lighting device 26a is also denoted as passenger reading light 26a.

The passenger reading light 26a comprises at least one light source 10, for example at least one LED. Although only one light source 10 is depicted in FIG. 4, the passenger reading light 26a may comprise a plurality of light sources 10 as well. The plurality of light sources 10 may be electrically coupled in a series connection or in a parallel connection or in a combined series and parallel connection.

For ease of illustration, only one passenger reading light 26a is depicted in FIG. 4. It is understood that the interior aircraft lighting assembly 2 may comprise more passenger reading lights, such as three passenger reading lights, corresponding to the three passenger reading lights 26a, 26b, 26c of FIG. 3, or six passenger reading lights, providing reading light outputs for two rows of passenger seats, or any other suitable number of passenger reading lights.

The interior aircraft lighting assembly 2 further comprises a lighting assembly controller 12. The lighting assembly controller 12 is configured for supplying electric energy to the lighting devices 4, 26a and for controlling the operation of the lighting devices 4, 26a.

The lighting assembly controller 12 comprises a permanent power output terminal 14, which is electrically coupled to a permanent power supply line 15, and a permanent ground terminal 18, which is electrically coupled to a permanent ground line 19. During operation of the aircraft 100, a permanent power supply voltage $U_{sup}$ is supplied to the permanent power output terminal 14 and to the permanent power supply line 15. The permanent power supply voltage $U_{sup}$ has a certain voltage value with respect to the permanent ground terminal 18 and the permanent ground line 19. The permanent power supply voltage $U_{sup}$ may be in the range of between 20 V and 300 V, the permanent power supply voltage $U_{sup}$ may in particular be a DC voltage of 28 V, 115 V or 270 V.

The lighting assembly controller 12 further comprises a switchable power output terminal 16, which is electrically coupled to a switchable power supply line 17, and a switchable ground terminal 20, which is electrically coupled to a switchable ground line 21.

The terms permanent power output terminal 14, permanent power supply line 15, permanent ground terminal 18, and permanent ground line 19 indicate that the power supply voltage is permanently present at the permanent power output terminal 14 and the permanent power supply line 15 in operation, i.e. that a constant voltage supply is present from the lighting assembly controller 12, and that a permanent ground connection is present at the permanent ground terminal 18 and the permanent ground line 19 via the lighting assembly controller 12 in operation. The terms switchable power output terminal 16, switchable power supply line 17, switchable ground terminal 20, and switchable ground line 21 indicate that a power supply voltage can be selectively applied to the switchable power output terminal 16 and the switchable power supply line 17 and that a ground connection can be selectively established at the switchable ground terminal 20 and the switchable ground line 21 by the lighting assembly controller 12 in operation. For the switchable power output terminal 16/switchable power supply line 17 and for the switchable ground terminal 20/switchable ground line 21, the terminology does not mean that both respective entities are switchable. Rather, the terminology means that, for all entities in question, the power supply/ground connection is selectively established. For example, for both the switchable power output terminal 16 and the switchable power supply line 17, there may be a single switch within the lighting assembly controller 12 or associated with the lighting assembly controller 12, which switch determines whether the power supply voltage is present at the switchable power output terminal 16 and the switchable power supply line 17 or not.

The electrical lines 15, 17, 19, 21, which are electrically coupled to the lighting assembly controller 12, constitute an electric power supply network of the interior aircraft lighting assembly 2.

The visual sign lighting device 4 is electrically coupled between the switchable power supply line 17 and the permanent ground line 19. This allows the lighting assembly controller 12 to switch the visual sign lighting device 4 on and off by selectively applying the power supply voltage to the switchable power output 16.

The passenger reading light 26a is electrically coupled between the permanent power supply line 15 and the switchable ground line 21. This allows the lighting assembly controller 12 to switch the passenger reading light 26a on and off by selectively coupling the switchable ground line 21 to a ground potential.

The electric coupling of the visual sign lighting device 4 and of the passenger reading light 26a, as depicted in FIG. 4, is only exemplary. In other configurations, which are not explicitly depicted in the figures, the visual sign lighting device 4 may be connected to a permanent power supply line and a switchable ground line and/or the passenger reading light 26a may be connected to a switchable power supply line and to a permanent ground line 19.

The interior aircraft lighting assembly 2 may also comprise more than one visual sign lighting device 4 an/or more than one passenger reading light 26a. For example, in case the interior aircraft lighting assembly 2 comprises more than one passenger reading light, such as three passenger reading lights, each one of the passenger reading lights may be coupled between the permanent power output terminal 14 and an individual switchable ground terminal. In this way, the lighting assembly controller 12 may individually switch each one of the passenger reading lights via the different switchable ground terminals. Similar considerations apply to implementations with more than one visual sign lighting device.

The lighting assembly controller 12 is coupled to a passenger reading light switch 27a provided within the PSU 120, as for example depicted in FIG. 3. The passenger reading light switch 27a allows a passenger, sitting on an associated one of the passenger seats 80a-80c below the PSU 120, to selectively switch the associated passenger reading light 26a on and off by operating the passenger reading light switch 27a. Again, for ease of illustration, only one passenger reading light switch 27a is depicted in FIG. 4. It is understood that multiple passenger reading light switches may be provided for individually switching multiple passenger reading lights.

The lighting assembly controller 12 may further be electrically coupled to a cabin management system 38. The cabin management system 38 is configured for supplying control commands to the lighting assembly controller 12 for controlling the lighting within the passenger cabin 102.

The interior aircraft lighting assembly 2 further comprises an infrared lighting device 22a and a supplementary infrared lighting device controller 36. The supplementary infrared lighting device controller 36 is configured for controlling the operation of the infrared lighting device 22a by selectively supplying electric power to the infrared lighting device 22a. Again, the interior aircraft lighting assembly 2 may comprise more than one infrared lighting device. In that case, it is possible that a separate supplementary infrared lighting device controller is provided for each of the multiple infrared lighting devices. It is also possible that a single supplementary infrared lighting device controller is provided for multiple infrared lighting devices.

The supplementary infrared lighting device controller 36 is, in turn, controlled by the lighting assembly controller 12. This will be described in more detail further below.

The at least one infrared lighting device 22a comprises at least one infrared light source 24, for example an infrared LED. The at least one infrared light source 24 may be integrated into the passenger reading light 26a, forming an integrated reading and infrared lighting device 46a, which allows for selectively emitting infrared light, visible light, or a combination of infrared light and visible light.

In an alternative configuration, the infrared lighting device 22a may be provided separately from the passenger reading light 26a. As depicted in the exemplary embodiment of FIG. 3, it is possible that three infrared lighting devices 22a, 22b, 22c are provided in the PSU 120, each of them being separated from an associated one of the three passenger reading lights 26a, 26b, 26c. In yet another alternative configuration, the PSU 120 comprises multiple passenger reading lights, such as three passenger reading lights, and only one infrared lighting device.

In order to have electric power available at the at least one infrared lighting device 22a and at the supplementary infrared lighting device controller 36, the supplementary infrared lighting device controller 36 is tapped into the power supply network.

In the exemplary embodiment depicted in FIG. 4, the supplementary infrared lighting device controller 36 is electrically coupled to the permanent power supply line 15, to the permanent ground line 19, and to the switchable ground line 21.

The infrared lighting device 22a is electrically coupled to the supplementary infrared lighting device controller 36, and the supplementary infrared lighting device controller 36 is configured for selectively supplying electric energy, received via the permanent power supply line 15, to the infrared lighting device 22a. The supplementary infrared lighting device controller 36 is configured to selectively switch the infrared lighting device 22a on and off.

The supplementary infrared lighting device controller 36 is in particular configured to enable a flow of electric power to the infrared lighting device 22a in response to detecting an electric trigger pulse on the power supply network.

The supplementary infrared lighting device controller 36 may in particular be configured to enable a flow of electric power to the infrared lighting device 22a in response to detecting an electric trigger pulse on the permanent power supply line 15.

The electric trigger pulse may include a temporary raising or lowering of the electric voltage that is applied to the permanent power supply line 15 by the lighting assembly controller 12 via the permanent power output terminal 14.

Alternatively or additionally to raising or lowering the electric voltage, applied to the permanent power supply line 15, the electric trigger pulse may include a temporary change of the polarity of an electric DC voltage that is applied to the permanent power supply line 15 by the lighting assembly controller 12 via the permanent power output terminal 14.

The duration of the electric trigger pulse may, for example, be in a range of between 10 ms and 100 ms, in particular in a range of between 25 ms and 75 ms, more particularly in a range of between 40 ms and 60 ms.

The supplementary infrared lighting device controller 36 may further be configured for supplying electric power to the infrared lighting device 22a for an infrared lighting duration $T_{IR}$, which is longer than the duration of the electric trigger pulse provided on the permanent power supply line 15.

The infrared lighting duration $T_{IR}$ may be a predetermined infrared lighting duration. The supplementary infrared lighting device controller 36 may be configured to deactivate the infrared lighting device 22a by disabling the flow of electric power to the infrared lighting device 22a after the predetermined infrared lighting duration $T_{IR}$ has expired.

The predetermined infrared lighting duration $T_{IR}$ may, for example, be at least ten times longer than the duration of the electric trigger pulse, provided on the permanent power supply line 15. The predefined infrared lighting duration $T_{IR}$ may in particular be at least a hundred times or at least a thousand times longer than the electric trigger pulse on the permanent power supply line 15.

Alternatively to activating the infrared lighting device 22a for a predetermined infrared lighting duration $T_{IR}$, the supplementary infrared lighting device controller 36 may be configured for supplying electric power to the infrared lighting device 22a, until a second electric trigger pulse is detected by the supplementary infrared lighting device controller 36. In such an embodiment, the lighting assembly controller 12 is configured for supplying a second electric trigger pulse on the permanent power supply line 15 for deactivating the infrared lighting device 22a. This allows for activating the infrared lighting device 22a for an arbitrary period of time.

In an interior aircraft lighting assembly 2 according to an exemplary embodiment of the invention, as depicted in FIG. 4, the lighting assembly controller 12 is able to activate the infrared lighting device 22a by supplying an electric trigger pulse via the permanent power supply line 15. The infrared lighting device 22a may be selectively activated and deactivated by the lighting assembly controller 12, using the existing power supply network, without adding additional power supply lines and/or control lines to the existing power supply network. Thus, a controllable infrared lighting device 22a may be added to an existing design of an interior aircraft lighting assembly 2, without the need for fundamentally re-configuring the interior aircraft lighting assembly 2. As a result, a controllable infrared lighting device 22a may be added to an existing design of an interior aircraft lighting assembly 2 at low costs and/or without a need to re-certify the interior aircraft lighting assembly 2. It is even possible to retrofit existing implementations of interior aircraft lighting assemblies with a controllable infrared lighting device 22a at reasonable efforts and cost.

For preventing the electric trigger pulse from causing an undesired and potentially annoying flickering of the passenger reading light 26a, the interior aircraft lighting assembly 2 may further include an electric damping circuit 30, which is coupled to the power supply network. The electric damping circuit 30 may in particular be coupled to the permanent power supply line 15 and to the switchable ground line 21, i.e. it may be coupled in parallel to the passenger reading light 26a. The electric damping circuit 30 may, for example, comprise a capacitor 32 or a combination of a capacitor 32 and a resistor 34, as it is depicted in FIG. 4.

The components of the electric damping circuit 30, such as the capacitor 32 and/or the resistor 34, may be dimensioned such that the electric damping circuit 30 absorbs most of or even all/substantially all of the electric energy of the electric trigger pulse. Accordingly, the passenger reading light 26a does not noticeable respond to the electric trigger pulse, e.g. by flickering.

The electric damping circuit 30 may be integrated with the supplementary infrared lighting device controller 36, as it is depicted in FIG. 4.

In an alternative embodiment, which is not explicitly shown in the figures, the electric damping circuit 30 may be provided separately from the supplementary infrared lighting device controller 36. The electric damping circuit 30 may, for example, also be integrated with the passenger reading light 26a.

In the configuration depicted in FIG. 4, the supplementary infrared lighting device controller 36 and the infrared lighting device 22a are electrically coupled to the permanent power supply line 15, to the switchable ground line 19, and to the permanent ground line 21. In consequence, the infrared lighting device 22a may be activated independently of the visual sign lighting device 4 and independently of the passenger reading light 26a. The infrared lighting device 22a may in particular be activated, even when the visual sign lighting device 4 and the passenger reading light 26a are switched off.

Figure 5:
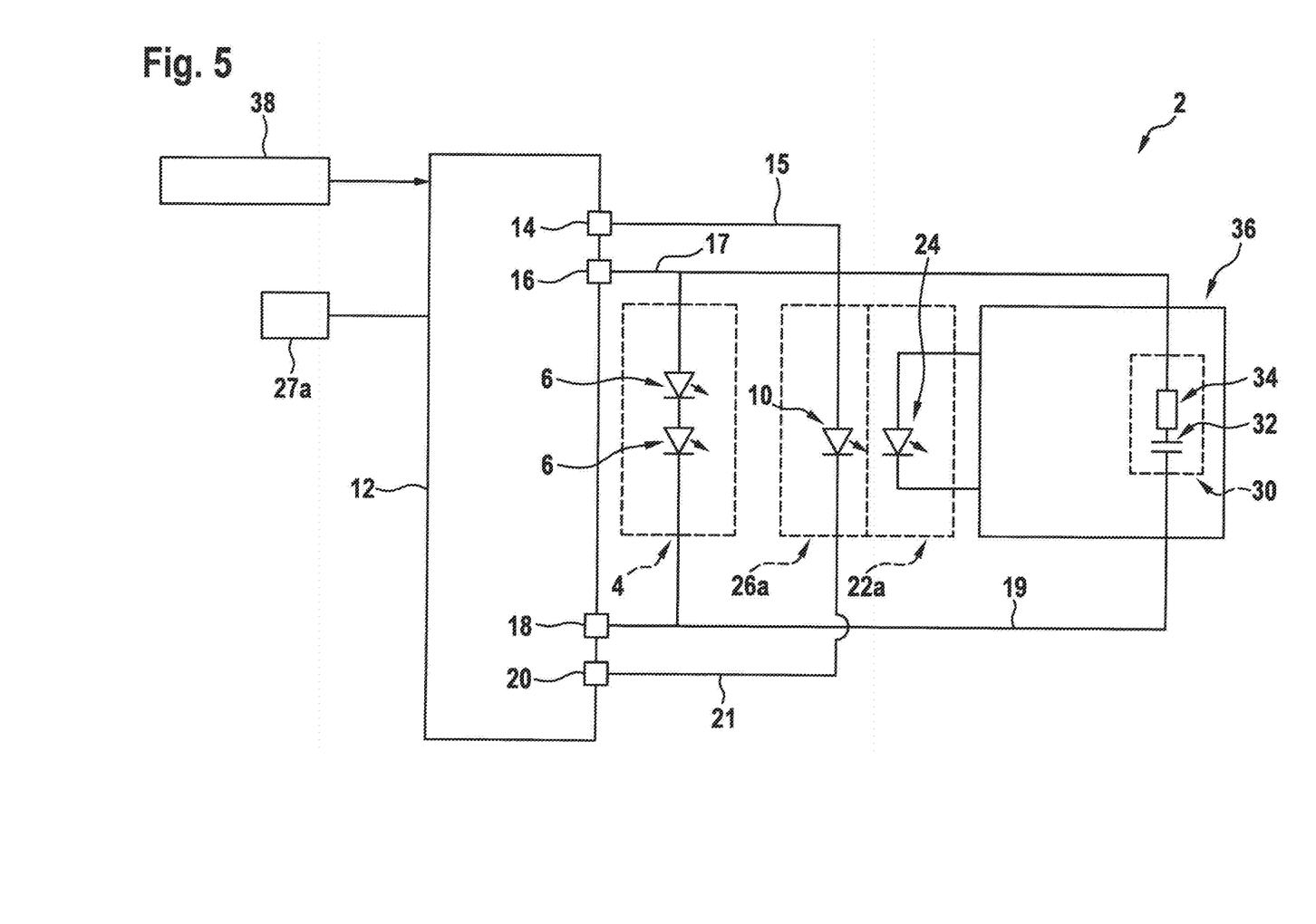
FIG. 5 depicts a circuit diagram of an interior aircraft lighting assembly in accordance with another exemplary embodiment of the invention.

FIG. 5 depicts a circuit diagram of an interior aircraft lighting assembly 2 in accordance with another exemplary embodiment of the invention.

The components of the interior aircraft lighting assembly 2 of FIG. 5 that are identical/analogous to the respective components of the interior aircraft lighting assembly 2 of FIG. 4 will not be described in detail again. Instead, reference is made to the above description of FIG. 4, and the differences between the embodiments depicted in FIGS. 4 and 5 will be the focus of the following description.

As compared to the embodiment depicted in FIG. 4, in the embodiment depicted in FIG. 5, the supplementary infrared lighting device controller 36 is not electrically coupled to the permanent power supply line 15, but to the switchable power supply line 17, which is provided for supplying electric power to the visual sign lighting device 4 via the switchable power output terminal 16. The other pole of the supplementary infrared lighting device controller 36 is electrically coupled to the permanent ground line 19 of the interior aircraft lighting assembly 2. In this way, the supplementary infrared lighting device controller 36 is connected in parallel with the visual sign lighting device 4.

In the embodiment depicted in FIG. 5, the supplementary infrared lighting device controller 36 is configured to supply electric power to the infrared lighting device 22a in response to detecting an electric trigger pulse that is provided on the switchable power supply line 17. In other words, in the embodiment depicted in FIG. 5, the infrared lighting device 22a may be activated and, potentially, deactivated by supplying an electric trigger pulse via the switchable power supply line 17 of the interior aircraft lighting assembly 2.

In the embodiment depicted in FIG. 5, since the supplementary infrared lighting device controller 36 is electrically coupled to the switchable power output terminal 16 and to the switchable power supply line 17, the supplementary infrared lighting device controller 36 and the infrared lighting device 22a are operable only, when electric power is supplied to the switchable power output 16, i.e. when the visual sign lighting device 4 is switched on. In case the visual sign lighting device 4 is a non-smoking signal light that is normally switched on during the entire duration of the flight, the functionality of the infrared lighting device 22a is also available for the entire duration of the flight.

In the embodiment depicted in FIG. 5, only two electric lines 17, 19, namely the switchable power supply line 17 and the permanent ground line 19, need to be tapped for coupling the supplementary infrared lighting device controller 36 to the lighting assembly controller 12. This may make the installation of the supplementary infrared lighting device controller 36 and of the infrared lighting device 22a even easier, as compared to the embodiment depicted in FIG. 4, in which three electric lines, namely the permanent power supply line 15, the permanent ground line 19, and the switchable ground line 21, are tapped for coupling the supplementary infrared lighting device controller 36 to the lighting assembly controller 12.

The embodiment depicted in FIG. 5 may therefore be particularly well-suited to retrofitting applications, i.e. in situations where a supplementary infrared lighting device controller 36 and an infrared lighting device 22a according to exemplary embodiments of the invention are added to an existing interior aircraft lighting assembly 2.

While not being explicitly shown in FIG. 4 and FIG. 5, it is understood that the supplementary infrared lighting device controller 36 has suitable circuitry for detecting the electric trigger pulse and for outputting a suitable power flow to the at least one infrared light source 24. For this purpose, the supplementary infrared lighting device controller 36 may for example have circuitry that can detect abrupt changes in the supplied voltage and that can measure the duration of a voltage pulse. Also, the supplementary infrared lighting device controller 36 may have a switch that is operated in response to the detection of the electric trigger pulse and that connects the at least one infrared light source 24 to the permanent power supply line 15/to the switchable power supply line 17 and to the permanent ground line 19, depending on the implementation. In this way, the at least one infrared light source 24 may receive electric power via the supplementary infrared lighting device controller 36.

It is further understood that the infrared lighting device may have any suitable infrared light output. For example, it is possible that the interior aircraft lighting assembly has one or more infrared lighting devices, with each of the infrared lighting devices being targeted to a particular passenger seat/to an expected position of a passenger's body and/or face on a particular passenger seat. It is also possible that the interior aircraft lighting assembly has one or more infrared lighting devices that has/have a broader opening angle and that contribute to a more general illumination of the aircraft cabin with infrared light.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. An interior aircraft lighting assembly, comprising:
    at least one infrared lighting device for emitting infrared light;
    at least one passenger reading light for emitting visible light;
    a lighting assembly controller for controlling an operation of the at least one infrared lighting device and of the at least one passenger reading light;
    a supplementary infrared lighting device controller; and
    a power supply network, which is configured for supplying electric power from the lighting assembly controller to the at least one passenger reading light;
    wherein the supplementary infrared lighting device controller is tapped into the power supply network;
    wherein the power supply network comprises a permanent power supply line, a permanent ground line, and at least one switchable ground line;
    wherein the supplementary infrared lighting device controller is electrically coupled between the permanent power supply line and the permanent ground line; and
    wherein each of the at least one passenger reading light is electrically coupled between the permanent power supply line and a respective switchable ground line, which is switchable by the lighting assembly controller for selectively activating and deactivating the respective reading light.

2. The interior aircraft lighting assembly according to claim 1, wherein the power supply network comprises a separate switchable ground line for each of the at least one passenger reading light.

3. The interior aircraft lighting assembly according to claim 1, wherein the lighting assembly controller is configured to provide an electric trigger pulse on the power supply network for activating the at least one infrared lighting device.

4. The interior aircraft lighting assembly according to claim 3, wherein the lighting assembly controller is configured to provide the electric trigger pulse on the permanent power supply line.

5. The interior aircraft lighting assembly according to claim 3, wherein the supplementary infrared lighting device controller is coupled to the at least one infrared lighting device and is configured to enable power flow to the at least one infrared lighting device in response to detecting the electric trigger pulse, provided by the lighting assembly controller on the power supply network.

6. An aircraft passenger service unit, comprising at least one interior aircraft lighting assembly according to claim 1.

7. The aircraft passenger service unit of claim 6, wherein the aircraft passenger service unit further comprises at least one of a loudspeaker, a gasper and a passenger oxygen supply mask.

8. An aircraft, comprising an interior aircraft lighting assembly according to claim 1.

9. An interior aircraft lighting assembly, comprising:
    at least one infrared lighting device for emitting infrared light;
    at least one visual sign lighting device for emitting visible light;
    a lighting assembly controller for controlling an operation of the at least one infrared lighting device and of the at least one visual sign lighting device;
    a supplementary infrared lighting device controller; and
    a power supply network, which is configured for supplying electric power from the lighting assembly controller to the at least one visual sign lighting device;
    wherein the supplementary infrared lighting device controller is tapped into the power supply network;
    wherein the power supply network comprises at least one switchable power supply line and a permanent ground line;
    wherein each of the at least one visual sign lighting device is electrically coupled between a respective switchable power supply line and the permanent ground line, with the respective switchable power supply line being switchable by the lighting assembly controller for selectively activating and deactivating the respective visual sign lighting device; and
    wherein the supplementary infrared lighting device controller is electrically coupled between one or more of the at least one switchable power supply line and the permanent ground line.

10. The interior aircraft lighting assembly according to claim 9, wherein the power supply network comprises a separate switchable power supply line for each visual sign lighting device.

11. The interior aircraft lighting assembly according to claim 9, wherein the lighting assembly controller is configured to provide an electric trigger pulse on the power supply network for activating the at least one infrared lighting device.

12. The interior aircraft lighting assembly according to claim 11, wherein the lighting assembly controller is configured to provide the electric trigger pulse on one or more of the at least one switchable power supply line, coupled to the supplementary infrared lighting device controller.

13. The interior aircraft lighting assembly according to claim 11, wherein the supplementary infrared lighting device controller is coupled to the at least one infrared lighting device and is configured to enable power flow to the at least one infrared lighting device in response to detecting the electric trigger pulse, provided by the lighting assembly controller on the power supply network.

14. The interior aircraft lighting assembly according to claim 9, wherein the supplementary infrared lighting device controller is electrically coupled between the permanent ground line and a particular switchable power supply line that is associated with a particular visual signal lighting device that is normally on.

15. The interior aircraft lighting assembly according to claim 14, wherein the particular visual signal lighting device is a non-smoking signal light.

16. An aircraft passenger service unit, comprising at least one interior aircraft lighting assembly according to claim 9.

17. The aircraft passenger service unit of claim 16, wherein the aircraft passenger service unit further comprises at least one of a loudspeaker, a gasper and a passenger oxygen supply mask.

18. An aircraft, comprising an interior aircraft lighting assembly according to claim 9.

\* \* \* \* \*